United States Patent [19]
Kronich et al.

[11] 4,394,893
[45] Jul. 26, 1983

[54] ENGINE SHUT-OFF SYSTEM WITH FLYWHEEL BRAKING

[75] Inventors: Peter G. Kronich, Sheboygan; Dan R. Arendt, Belgium, both of Wis.

[73] Assignee: Tecumseh Products Company, Tecumseh, Mich.

[21] Appl. No.: 205,010

[22] Filed: Nov. 7, 1980

[51] Int. Cl.³ .............................................. B60K 41/20
[52] U.S. Cl. ............................................. 192/1; 192/35
[58] Field of Search ............... 192/8 A, 3 R, 7, 1, 192/3 S, 3 M, 0.082, 17 R, 12 R; 56/10.5, 10.8, 11.3; 74/850

[56] References Cited
U.S. PATENT DOCUMENTS

| 2,959,261 | 11/1960 | Hemphill | 192/3 R |
| 3,228,177 | 1/1966 | Coates | 56/10.8 |
| 3,290,871 | 12/1966 | Haas | 56/10.8 |
| 3,744,602 | 7/1973 | Ajwani | 192/3 R |
| 3,799,300 | 3/1974 | Cochrane et al. | 192/3 R |
| 4,035,994 | 7/1977 | Hoff | 56/11.3 |

Primary Examiner—George H. Krizmanich
Attorney, Agent, or Firm—Albert L. Jeffers; Roger M. Rickert

[57] ABSTRACT

A system for quickly stopping the internal combustion engine of a powered implement having a deadman control normally biased toward a first position and acutable by the implement operator to a second position and having an operator actuable engine starting mechanism is disclosed. The engine has a flywheel coupled thereto for rotation with the engine crankshaft and that flywheel is provided with an annular friction surface disposed generally in a plane normal to the axis of rotation of the flywheel. A braking member having a second friction surface is normally biased into engagement with the annular friction surface of the flywheel and coupled to the deadman control so that the two friction surfaces will be disengaged upon movement of the deadman control to a second or operational position by the implement operator. An arrangement for disabling the engine starting mechanism while the friction surfaces are engaged and an arrangement for disabling the engine ignition system when the deadman control is released are disclosed. The braking member may move into engagement by pivotal movement, movement perpendicular to the flywheel annular friction surface, or by moving generally parallel to the flywheel annular surface and into engagement with a ramp forcing the braking member toward the flywheel surface.

25 Claims, 7 Drawing Figures

ENGINE SHUT-OFF SYSTEM WITH FLYWHEEL BRAKING

BACKGROUND OF THE INVENTION

The present invention relates generally to safety devices for internal combustion engine powered implements and more particularly to such safety devices which function to promptly stop the engine in the event that the implement operator moves from his normal operating position.

The need for safety devices for power driven implements to reduce the probability of injury to the operator or others has long been recognized and a wide variety of such safety devices are known. The provision of a protective shield or shroud around dangerous moving parts is commonplace as is the automatic disabling of a dangerous instrumentality when its normal operating mode is interrupted.

A typical illustration of the disabling type safety device is the so-called deadman lever. Such levers are frequently employed on the handle of lawnmowers, garden tillers, snowblowers and the like, and require the operator to be gripping the handle and depressing the lever against a normal spring bias to render the device operational. In the event that the operator releases his grip on the handle, the deadman lever moves typically away from the handle to a position to disable the device. One such known deadman lever disables the ignition circuit on an internal combustion engine rotary lawnmower. Another known deadman lever arrangement is connected to an idler wheel or pulley in the V-belt drive arrangement for a garden tiller with that pulley spring biased toward a position away from the V-belt. Under these conditions the V-belt drive is interrupted since the belt is larger than required to connect the engine to the tiller moving parts and only when the deadman lever is depressed forcing the pulley into engagement with the V-belt and removing slack from the V-belt drive is the tiller operational.

Another known application of a deadman lever to a power driven implement is the interposition of a clutch brake arrangement between the power source such as an internal combustion engine and the dangerous instrumentality such as the rotating blade of a rotary lawnmower or snowthrower. The deadman lever when depressed actuates the clutch to couple the power source to the rotating blade while when the lever is released the clutch is disengaged and a brake actuated to stop the rotary blade.

It would be highly desirable to retain the advantages of the deadman lever type safety device without the necessity of providing a clutch drive between the power source and the dangerous instrumentality and further highly desirable to reduce as far as possible the time interval between the release of the deadman lever and the stopping of the dangerous instrumentality. It would also be highly desirable to provide a safety device wherein the operator must return to his normal operating position before the instrumentality may be reenergized.

SUMMARY OF THE INVENTION

Among the several objects of the present invention may be noted the provision of an arrangement responsive to a deadman control which when that control is released operates to rapidly stop engine motion; the provision of a safety device for an internal combustion engine powered implement having a deadman control normally biased toward a first position and actuable by an implement operator to a second position wherein in the first position the deadman control allows a braking member to engage the engine flywheel to stop the engine; the provision of a safety device for an engine powered implement such as a lawnmower, garden tiller or snowthrower wherein clutching between the engine and blade of the implement is not necessary for the rapid and safe stopping of the engine when the operator moves from his normal operating position; and the provision of a brake arrangement for an internal combustion engine wherein the engine starting mechanism can not be enabled until the brake has been released.

Safety braking arrangements for internal combustion engine powered lawnmowers have been attempted but have met with little commercial success. One reason for the failure of these prior devices to become accepted in the marketplace is that the braking function has occurred beneath the lawnmower deck in an area where grass cuttings, moisture and other particles readily accumulate and either reduce the effective braking operation due to slippage or accumulate to such an extent that braking is applied at all times. Such arrangements are particularly unsuited to hand-started lawnmowers since a single operator must simultaneously grip the deadman control and crank the engine or two people are required to effectively start the lawnmower.

It is accordingly a further object of the present invention to provide a safety braking function to the engine flywheel away from the regions of accumulation of dirt, moisture, grass clippings and the like. A still further object of the present invention is to provide an engine braking safety arrangement in an electric start implement wherein the brake must be released before the electric start arrangement may be energized. These as well as other objects and advantageous features of the present invention will be in part apparent and in part pointed out hereinafter.

In general a safety device for an internal combustion engine includes a flywheel coupled to the engine crankshaft for rotation therewith, a braking member having a friction surface normally biased into engagement with a lower annular friction surface lying generally in a plane normal to the axis of rotation of the flywheel, a coupling arrangement between the braking member and a deadman control for retracting the friction surface out of engagement with the flywheel rim upon actuation of the deadman control by an implement operator, and a pair of electrical switches actuated by movement of the braking member. One switch may operate to disable the engine ignition upon braking and the other switch preclude starting of the engine until the brake is disengaged.

Also in general and in one form of the invention an engine crankshaft flywheel has an annular friction surface lying generally in a plane normal to the axis of rotation of the flywheel and a second friction surface normally biased into engagement with the flywheel friction surface along with a deadman control which when actuated by the operator separates the two friction surfaces while when the operator releases the deadman control the two friction surfaces are automatically engaged to rapidly stop the engine.

Still further in general and in one form of the invention, an engine crankshaft supported flywheel is normally engaged by the friction surface of a braking member but may be disengaged from that surface by the actuation of a deadman control by an implement operator with an operator actuable engine starting mechanism remaining disabled so long as the friction surface engages the flywheel.

BRIEF DESCRIPTION OF THE DRAWING

Corresponding parts are identified by corresponding reference characters throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
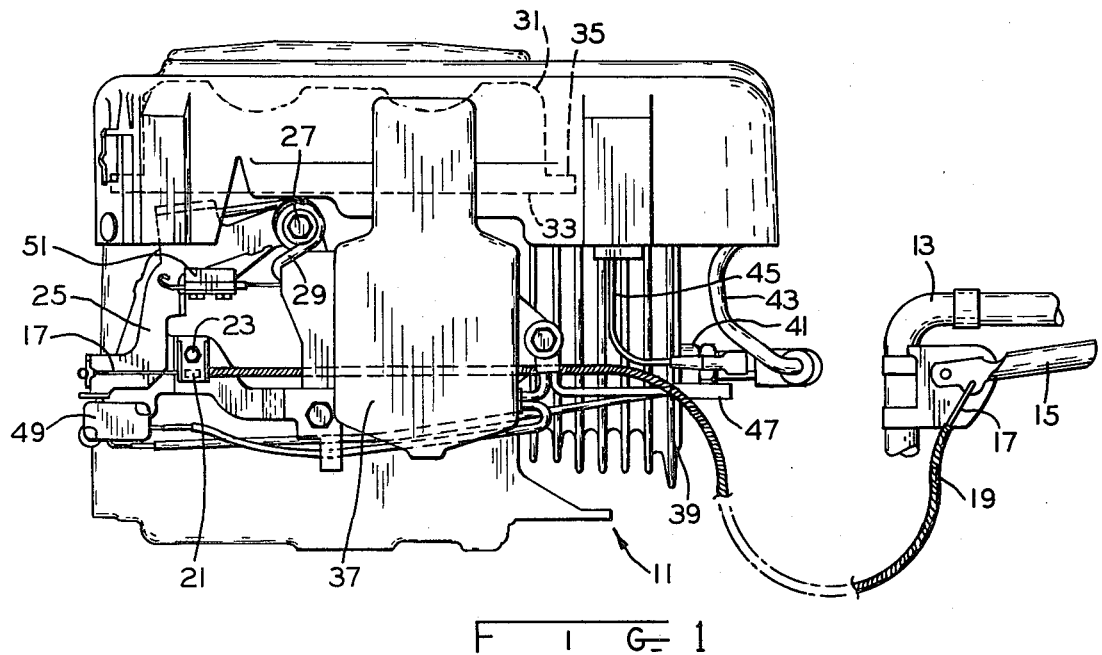
FIG. 1 is a side elevation view of a portion of an internal combustion engine and a portion of an implement powered by the internal combustion engine having an electric start feature and illustrating the safety device of the present invention in one form.

Referring now to FIG. 1, an internal combustion engine 11 powers an implement such as a lawnmower, snowthrower or garden tiller with handle 13 of that implement illustrated. A deadman control lever 15 is gripped by the implement operator pulling the deadman control lever toward the handle 13 and extracting cable 17 from sheath 19 of a conventional Boden cable. The other end of sheath 19 is clamped to the engine by clamp 21 and bolt 23 with the wire or cable 17 fastened to a braking member 25. Thus, upward movement of the lever 15 causes the braking member 25 to pivot counterclockwise about a pivot pin 27 while when that lever is released and moves downwardly, a spring 29 causes the braking member to pivot in a clockwise direction.

The engine crankshaft has fastened to the upper end thereof a flywheel 31 with a lower annular friction surface 33 lying generally in a plane normal to the axis of rotation of the flywheel and crankshaft. The engine flywheel 31 may have a peripheral surface 35 provided with teeth to be engaged by a starter gear in the electric engine starting mechanism 37.

Also illustrated in FIG. 1 are the engine cylinder 39 having a sparkplug 41 with ignition lead 43 to the engine ignition circuitry and with lead 45 from a magneto associated with the engine flywheel to be coupled to a storage battery for battery charging purposes. Lead 47 is for connection to an electric starter switch and is connected to a starter interlock switch 49 and an ignition disabling switch 51 is also illustrated. The interrelationship of these several parts will be become more apparent as the description proceeds.

Figure 2:
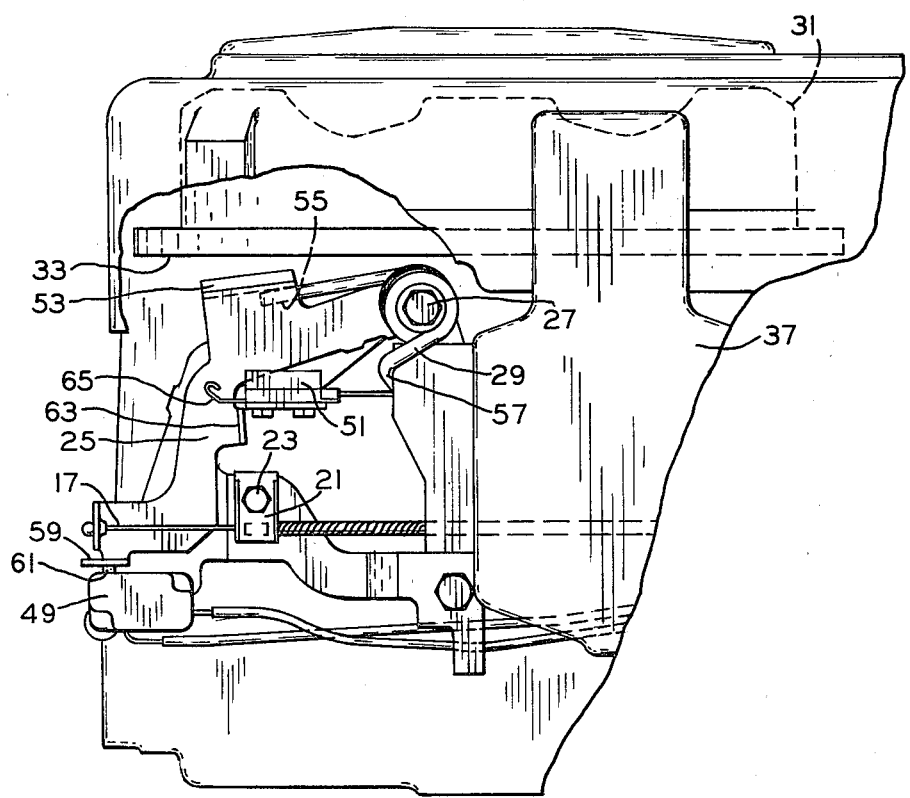
FIG. 2 is a side elevation view of a portion of FIG. 1 in greater detail and illustrating the safety device in its configuration for normal starting and running of the engine.
Figure 3:
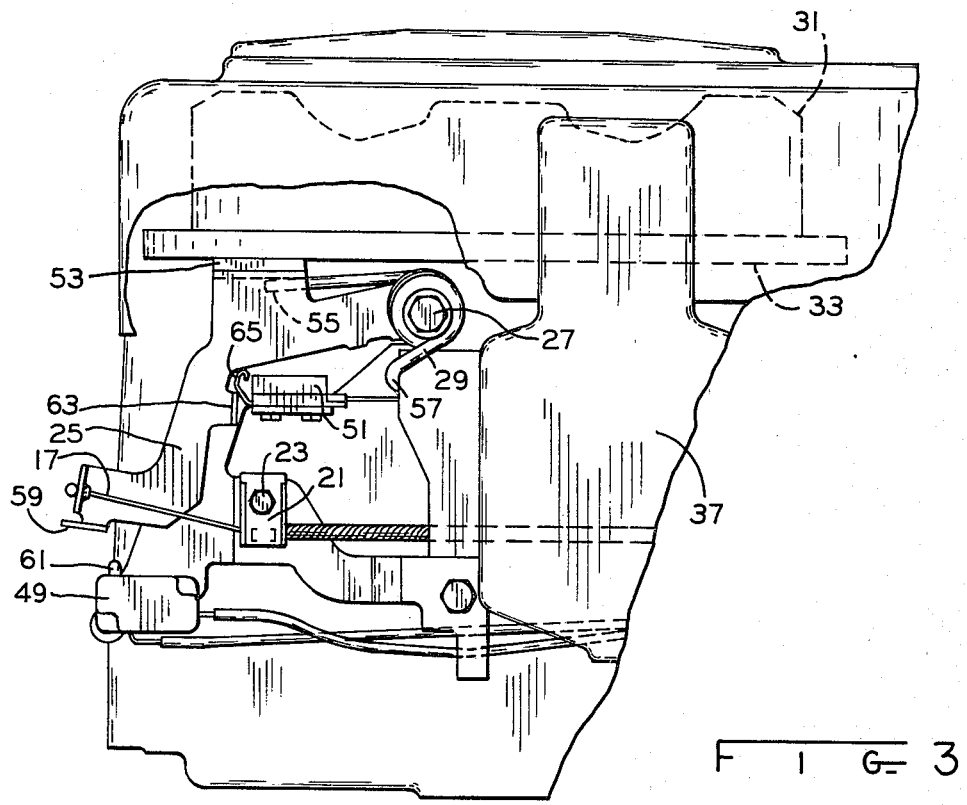
FIG. 3 is a view of the safety device of FIG. 2 when in the engine braking configuration.

Referring now to FIGS. 2 and 3, it will be noted that the braking member 25 may pivot about axis 27 between the positions illustrated in these two Figures. Spring 29 has end 55 engaged with the underside of the braking member with the opposite side of that braking member supporting the friction surface or brake pad 53. The other end 57 of spring 29 engages a fixed portion of the engine and the spring is tensioned so as to urge the braking member 25 to rotate in a clockwise direction about a pin or bolt 27 which functions as the axis of the coiled portion of spring 29 as well as the pivot point for the braking member 25. Thus, when the deadman control handle 15 is gripped by the operator and moved toward implement handle 13, the braking member 25 is maintained in the position illustrated in FIG. 2 with a surface 59 thereof engaging plunger 61 of switch 49 to maintain that switch closed. When the deadman control is released, spring 29 moves the braking member 25 in a clockwise direction so that the annular friction surface 33 of the underside of the flywheel is engaged by friction surface 53, as illustrated in FIG. 3. When this occurs, plunger 61 of switch 49 is spring biased to move upwardly opening that switch. The braking member 25 includes a further tab 63 which engages arm 65 of switch 51 to close that switch in the position illustrated in FIG. 3, while that switch is opened when the braking member is in the position illustrated in FIG. 2. Thus, it will be seen that the biasing of the braking member toward the flywheel, as well as the biasing of the deadman control is provided by the coil spring 29 and that the braking member upon release of the deadman control pivots about the pin or bolt 27 into the braking position illustrated in FIG. 3.

Figure 4:
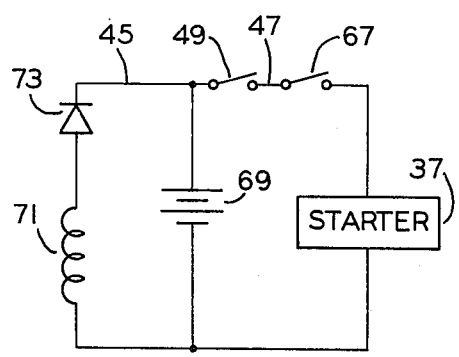
FIG. 4 is a schematic diagram of one possible engine starter circuit.

Referring to FIG. 4 which schematically illustrates the operator actuable engine starting mechanism, it will be noted that switch 49 is closed only when the engine brake is disengaged, that is, when the deadman control is gripped by the operator. A key start or other starting switch 67 is accessible to the operator when gripping the deadman control handle 15 and may be closed to supply current from storage battery 69 to the starter motor 37 for cranking the engine. A trickle charging coil 71 and diode 73 may supply unidirectional current flow for charging battery 69, for example by placing coil 71 in proximity with a rotating permanent magnet associated with the flywheel 31, as is known in the art.

Figure 5:
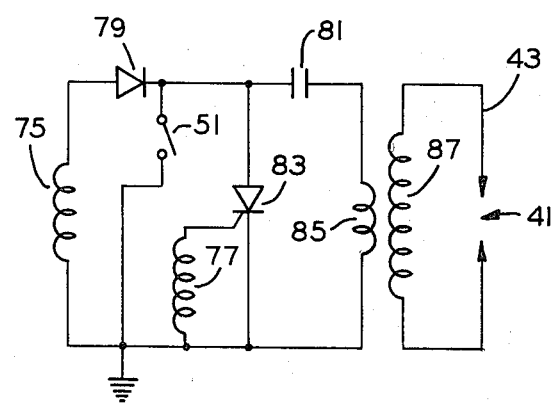
FIG. 5 is a schematic diagram of one possible electrical ignition system for the engine.

Referring now to FIG. 5, flywheel 31 may also have the permanent magnet thereof inducing voltages in coils 75 and 77, for example in the manner illustrated in U.S. Pat. No. 3,661,132 to Farr and assigned to the assignee of the present invention. The ignition circuitry of FIG. 5 is illustrative only and numerous ignition systems are certainly possible. In FIG. 5, current induced in coil 75 is supplied by way of diode 79 to charge capacitor 81 so long as switch 51 is opened. It will be remembered that switch 51 is opened only when the braking member 25 is in the position illustrated in FIG. 2. Voltages induced in coil 77 trigger silicon controlled rectifier 83 to discharge the charge accumulated on capacitor 81 through primary winding 85, inducing a high voltage in secondary winding 87 to be supplied to the sparkplug 41. Thus, closing switch 51 will preclude the accumulation of any charge on capacitor 81 and therefore disable the ignition system when the braking member is in the position illustrated in FIG. 3.

Figure 6:
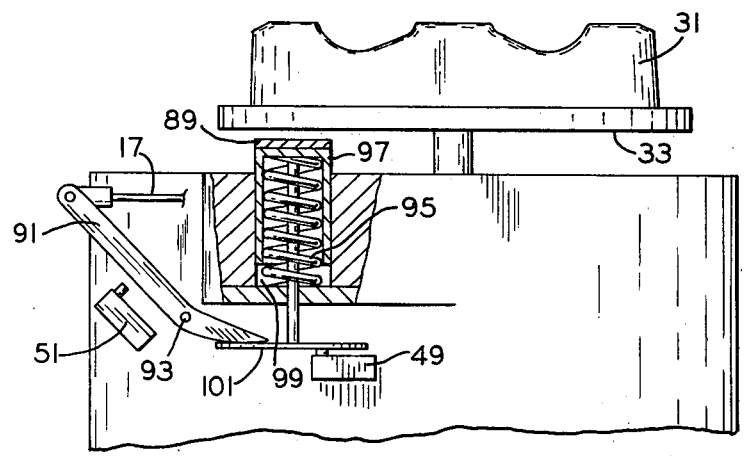
FIG. 6 illustrates one alternate form for the braking member of the safety device.

Referring now to FIG. 6, the underside annular friction surface 33 of flywheel 31 is to be engaged by a friction surface or brake pad 89 when the deadman control is released with cable 17 allowing link 91 to pivot counterclockwise as viewed about pivot pin 93, allowing the coil spring 95 to urge piston 97 upwardly. Piston 97 is disposed in a cylinder 99 fixed relative to the engine and coil spring 95 normally compressed so as to both bias the deadman control toward its released position and the brake pad 89 toward engagement with the flywheel 31. When the operator actuates the deadman control, cable 17 is pulled causing rotation of lever 91 clockwise about pivot pin 93 and this lever since it engages the lower plate 101 of piston 97, retracts the piston out of engagement with the flywheel and also causes closing of switch 49 with this switch as well as switch 51 operating as described in reference to FIGS. 4 and 5.

Figure 7:
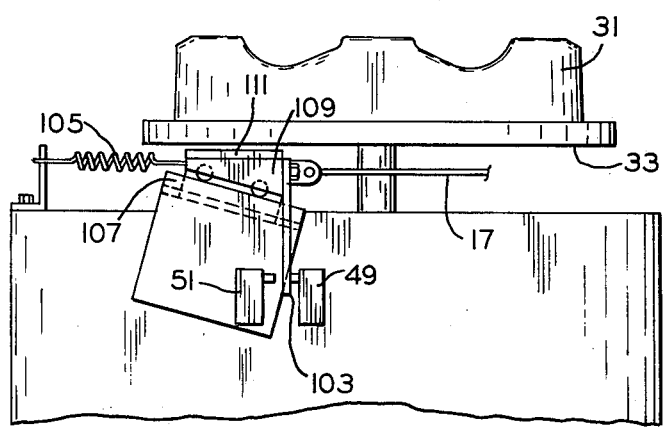
FIG. 7 illustrates another alternate form for the braking member of the safety device.

Switches 49 and 51 are also depicted on FIG. 7 and actuated in an analagous manner by plate 103 which moves toward the right as viewed when the cable 17 is pulled as by actuation of the deadman control while plate 103 is urged toward the left and into engagement with switch 51 by a coil spring 105. In FIG. 7, the engine supports an inclined ramp 107 which is fixed with respect to the engine and the braking member now comprises a tapered block 109 positioned between the flywheel 31 and the inclined ramp. The tapered block includes a friction surface or brake pad 111 facing the flywheel annular surface 33 and with an opposed oblique face engaging the inclined ramp 107. Thus, the tapered block 109 is normally biased into wedging engagement between the flywheel and ramp to engage braking surfaces 111 and 33, stopping the engine as before.

From the foregoing it is now apparent that a novel safety device for an internal combustion engine powered implement has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. A safety device for an internal combustion engine powered implement having a deadman control normally biased toward a first position and actuable by an implement operator to a second position comprising:
a flywheel coupled to the engine crankshaft for rotation therewith;
a braking member having a friction surface normally biased into engagement with an annular surface of the flywheel, biasing of the deadman control and the biasing of the braking member both being accomplished by one coil spring, the braking member comprising a friction surface supporting lever, a pivot pin fixed relative to the engine pivotably supporting the friction surface supporting lever near one end thereof, the coil spring encircling the pivot pin and having one end fixed relative to the engine and the other end fixed relative to the friction surface supporting lever;
means coupling the braking member to the deadman control for retracting the frictional surface out of engagement with the flywheel annular surface upon movement of the deadman control to the second position;
a pair of electrical switches actuated by movement of the braking member, one of the electrical switches being actuated by movement of the braking member toward its engine engaging position to disable the engine ignition system.

2. The safety device of claim 1 wherein the braking member comprises a cylinder fixed relative to the engine, a piston movable within and extending beyond the cylinder with the friction surface provided on one end of the piston, and a lever engaging the piston and operable in response to operator actuation of the deadman control to the second position thereof to retract the piston out of engagement with the flywheel and further into the cylinder.

3. The safety device of claim 2 further comprising a coil spring compressed within the cylinder for urging the friction surface into engagement with the flywheel.

4. The safety device of claim 1 wherein the engine supports an inclined ramp fixed with respect to the engine, the braking member comprising a tapered block positioned between the flywheel and the inclined ramp with the friction surface on one face thereof facing the flywheel and with an opposed oblique face engaging the inclined ramp, the tapered block being normally biased into wedging engagement between the flywheel and the ramp.

5. A safety device for an internal combustion engine powered implement having a deadman control normally biased toward a first position and actuable by an implement operator to a second position comprising:
a flywheel coupled to the engine crankshaft for rotation therewith, the flywheel being provided with a first annular friction surface lying generally in a plane normal to the axis of rotation of the flywheel;
a braking member having a second friction surface normally biased into engagement with the flywheel first friction surface; and
means coupling the braking member to the deadman control for retracting the second friction surface out of engagement with the first annular friction surface upon movement of the deadman control to the second position by the implement operator.

6. The safety device of claim 5 further comprising a pair of electrical switches actuated by movement of the braking member.

7. The safety device of claim 6 wherein one of the electrical switches is actuated by movement of the braking member toward its flywheel engaging position to disable the engine ignition system.

8. The safety device of claim 6 wherein the implement includes an operator actuable engine starting mechanism, one of the electrical switches being actuated by movement of the braking member toward its flywheel engaging position to disable the engine starting mechanism.

9. The safety device of claim 5 wherein the biasing of the deadman control and the biasing of the braking member are both accomplished by the same means.

10. The safety device of claim 9 wherein the biasing of the deadman control and of the braking member is accomplished by a coil spring, the braking member comprising a friction surface supporting lever pivotably attached near one end thereof to the engine.

11. The safety device of claim 10 including a pivot pin fixed relative to the engine pivotably supporting the friction surface supporting lever one end, the coil spring encircling the pivot pin and having one end fixed relative to the engine and the other end fixed relative to the friction surface supporting lever.

12. The safety device of claim 5 wherein the braking member comprises a cylinder fixed relative to the engine, a piston movable within and extending beyond the cylinder with the friction surface provided on one end of the piston, and a lever engaging the piston and operable in response to operator actuation of the deadman control to the second position thereof to retract the piston out of the engagement with the flywheel and further into the cylinder.

13. The safety device of claim 12 further comprising a coil spring compressed within the cylinder for urging the friction surface into engagement with the flywheel.

14. The safety device of claim 5 wherein the engine supports an inclined ramp fixed with respect to the engine, the braking member comprising a tapered block positioned between the flywheel and the inclined ramp with the friction surface on one face thereof facing the flywheel and with an opposed oblique face engaging the inclined ramp, the tapered block being normally biased into wedging engagement between the flywheel and the ramp.

15. A safety device for an internal combustion engine powered implement having a deadman control normally biased toward a first position and actuable by an implement operator to a second position, and an operator actuable engine starting mechanism comprising:
a flywheel coupled to the engine crankshaft for rotation therewith, the flywheel being provided with a first annular friction surface lying generally in a plane normal to the axis of rotation of the flywheel;
a braking member having a friction surface normally biased into engagement with the annular surface of the flywheel;
means coupling the braking member to the deadman control for retracting the friction surface out of engagement with the flywheel annular surface upon movement of the deadman control to the second position; and
means disabling the engine starting mechanism while the friction surface is in engagement with the flywheel.

16. The safety device of claim 15 further comprising a pair of electrical switches actuated by movement of the braking member.

17. The safety device of claim 16 wherein one of the electrical switches is actuated by movement of the braking member toward its flywheel engaging position to disable the engine ignition system.

18. The safety device of claim 16 wherein the implement includes an operator actuable engine starting mechanism, one of the electrical switches being actuated by movement of the braking member toward its flywheel engaging position to disable the engine starting mechanism.

19. The safety device of claim 15 wherein the biasing of the deadman control and the biasing of the braking member are both accomplished by the same means.

20. The safety device of claim 19 wherein the biasing of the deadman control and of the braking member is accomplished by a coil spring, the braking member comprising a friction surface supporting lever pivotably attached near one end thereof to the engine.

21. The safety device of claim 20 including a pivot pin fixed relative to the engine pivotably supporting the friction surface supporting lever one end, the coil spring encircling the pivot pin and having one end fixed relative to the engine and the other end fixed relative to the friction surface supporting lever.

22. The safety device of claim 15 wherein the braking member comprises a cylinder fixed relative to the engine, a piston movable within and extending beyond the cylinder with the friction surface provided on one end of the piston, and a lever engaging the piston and operable in response to operator actuation of the deadman control to the second position thereof to retract the piston out of engagement with the flywheel and further into the cylinder.

23. The safety device of claim 22 further comprising a coil spring compressed within the cylinder for urging the friction surface into engagement with the flywheel.

24. The safety device of claim 15 wherein the engine supports an inclined ramp fixed with respect to the engine, the braking member comprising a tapered block positioned between the flywheel and the inclined ramp with the friction surface on one face thereof facing the flywheel annular surface and with an opposed oblique face engaging the inclined ramp, the tapered block being normally biased into wedging engagement between the flywheel and the ramp.

25. The safety device of claim 15 wherein the engine starting mechanism includes an electric start motor engageble upon energization with the flywheel to turn the flywheel thereby cranking the engine, a storage battery supported on the implement, an operator actuable start switch for energizing the start motor, and a starter interlock switch in series with the start switch between the storage battery and the start motor for precluding starter energization when the braking member friction surface is in engagement with the flywheel rim.

* * * * *